United States Patent [19]
Novis et al.

[11] Patent Number: 5,770,849
[45] Date of Patent: Jun. 23, 1998

[54] SMART CARD DEVICE WITH PAGER AND VISUAL IMAGE DISPLAY

[75] Inventors: Scott R. Novis, Tempe; William E. Carns, Forest Lakes; Karen E. Jachimowicz, Laveen, all of Ariz.

[73] Assignee: Motorola, Inc., Schaumburg, Ill.

[21] Appl. No.: 702,087

[22] Filed: Aug. 23, 1996

[51] Int. Cl.$^6$ .............................................. G06K 14/067
[52] U.S. Cl. ........................................ 235/492; 235/487
[58] Field of Search .................................. 235/380, 487, 235/492

[56] References Cited

U.S. PATENT DOCUMENTS

| | | | |
|---|---|---|---|
| 4,614,861 | 9/1986 | Pavlov et al. | 275/380 |
| 4,972,476 | 11/1990 | Nathans | 235/487 |
| 5,180,906 | 1/1993 | Yamada | 235/487 |
| 5,235,680 | 8/1993 | Bijnagte | 395/161 |

*Primary Examiner*—Harold Pitts
*Attorney, Agent, or Firm*—Eugene A. Parsons

[57] ABSTRACT

A smart card device (10) including a portable housing (11) with a viewing aperture (25) and a virtual image display (30) positioned to provide an image at the aperture (25) of information contained on a smart card (13) as well as transactions processed in response to data transmitted by a transceiver (17) between a host database (96) and the smart card device (10). A sensor (15) in the housing (11) constructed to have the smart card (13) with data stored thereon positioned adjacent thereto in data sensing juxtaposition and electronics (16) mounted in the housing (11) and connected to the sensor (15) for processing data between the host database (96) and the smart card device (10), the electronics (16) further connected to the sensing structure (15) for reading and writing data thereto, the communications transceiver (17) for transmitting and receiving data between the smart card device (10) and the host database (96), and the virtual image display (30) for supplying image data.

25 Claims, 3 Drawing Sheets

SMART CARD DEVICE WITH PAGER AND VISUAL IMAGE DISPLAY

FIELD OF THE INVENTION

The present invention pertains, generally, to portable smart card devices and, more particularly, to a portable smart card device including a communications transceiver and a visual display.

BACKGROUND OF THE INVENTION

Smart cards are becoming very popular around the world. Generally a smart card is defined as a card (similar in size to a common credit card) containing a semiconductor chip with some electronics and a memory for storing information. Smart cards are used to store personal information, ranging from medical information to financial data, as well as the storage of monetary value. The large amount of information, or data, stored on a smart card is not generally accessible or capable of editing or use without the intervention of a smart card device, that is capable of being interfaced with the smart card. Since, various different smart cards are presently in use, including those that operate at a variety of different voltages and those that can be accessed by electrical contacts, contactless cards, optically readable cards, magnetically readable cards, etc. It is desirable, therefore, to provide means whereby the owner can view the stored information on the card to determine the status as well as providing means for the conducting of commercial and financial transactions utilizing the smart card.

With the enablement of individuals to view a range of personal information stored on smart cards, the desire to perform various functions, such as editing information contained on the cards, increasing value stored on value or cash cards, making advance purchases utilizing the card, or the like, are becoming increasingly of interest. More specifically, there is a desire to perform transactions through wireless technology utilizing information stored on the card and a host database, such as a financial institution, ticketing agency, mail-order company, or the like.

It is a purpose of the present invention to provide new and improved apparatus for viewing and utilizing information stored on a smart card.

It is yet another purpose of the present invention to provide for new and improved apparatus for viewing, editing and performing various types of commercial and financial transactions, utilizing smart card technology and wireless transmissions.

It is still another purpose of the present invention to provide new and improved apparatus for viewing information stored on a smart card as well as performing transactions utilizing the smart card, which apparatus contains safe features to prevent unwarranted viewing and use of the information and the smart card.

It is a further purpose of the present invention to provide new and improved apparatus for conducting transactions utilizing a smart card, which apparatus is portable, wireless and easy to operate.

SUMMARY OF THE INVENTION

The above problems and others are at least partially solved and the above purposes and others are realized in a smart card device including a portable housing with a viewing aperture and a visual image display, such as a virtual image display, positioned in the housing to provide an image for viewing at the viewing aperture. The visual image display also includes a data input terminal designed to receive image data thereon. A sensor structure is mounted in the housing and constructed to have a smart card with data stored thereon positioned adjacent thereto in data sensing juxtaposition. The sensor structure includes an input terminal for receiving data thereon and an output terminal having sensed data thereon. Electronics are mounted in the housing and connected to the input terminal and the output terminal of the sensor structure for receiving, processing and transmitting data between a host database and the smart card and are further connected to the input terminal of the visual image display for supplying image data thereto in response to the data. The smart card device of the present invention further includes a transceiver mounted in the housing and connected to the electronics for receiving and transmitting data between the electronics of the portable smart card device and the host database.

BRIEF DESCRIPTION OF THE DRAWINGS

Referring to the drawings.

DESCRIPTION OF THE PREFERRED EMBODIMENTS

Figure 1:
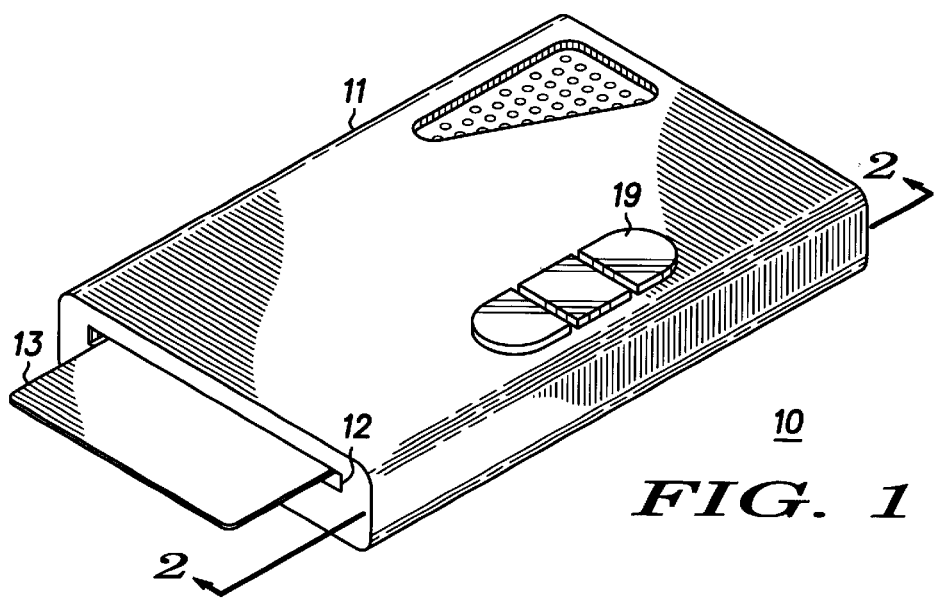
FIG. 1 is an isometric view of a portable smart card device in accordance with the present invention.
Figure 2:
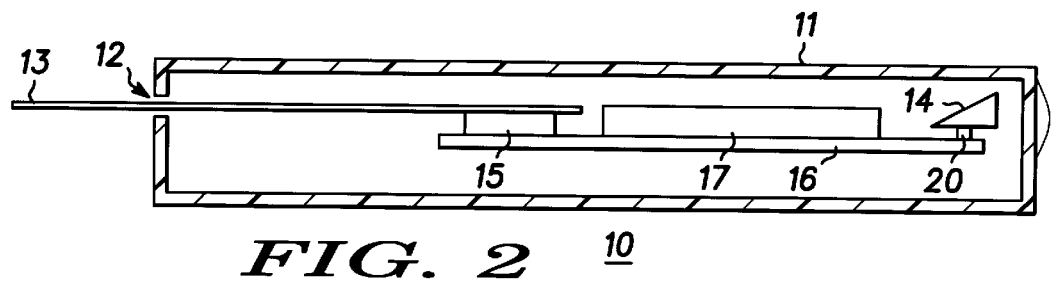
FIG. 2 is a simplified sectional view as seen along the line 2—2 of FIG. 1.

Turning now to the drawings, FIGS. 1 and 2 illustrate a specific embodiment of a smart card device 10 in accordance with the present invention. Smart card device 10 includes a portable housing 11 which is ergonomically designed to be handheld, that is, housing 11 is formed to conveniently fit the hand and allow comfortable use of a plurality of controls 19 to operate the device. Housing 11 also includes a slot 12 for receiving a smart card 13 therein and allowing the sensing of information stored on smart card 13. Slot 12 is designed to place smart card 13 adjacent to sensor structure 15 mounted in housing 11 in data sensing juxtaposition. It will of course be understood that while slot 12 is preferable for correctly positioning smart card 13, other structures might be utilized, including simply placing smart card 13 adjacent to a sensor structure that is externally accessible.

Housing 11 also has a visual display 14 mounted therein for providing a visual image of the information stored on smart card 13 and information pertaining to transactions performed utilizing smart card device 10 and communications with a host database (discussed presently). Electronics 16 are mounted in housing 11 in electrical communication with sensor structure 15 and a communications transceiver 17, which in this specific embodiment are illustrated as being mounted directly on a circuit board containing and interconnecting electronics 16, sensor structure 15, and communications transceiver 17. The circuit board containing electronics 16 is also positioned to have mounted thereon and electrically connected to electronics 16, apparatus 20 including a two dimensional array of light emitting devices connected to provide a complete real image in visual display 14. Generally, electronics 16 include a central processing unit (CPU) and memory (RAM or ROM) capable of working with the CPU and visual display 14.

In a preferred embodiment, sensor structure 15 is constructed to physically engage external electrical contacts on smart card 13 so that smart card 13 is directly connected to the CPU in electronics 16. The CPU is programmed to interface with the memory and circuitry on smart card 13 and provide the information stored on smart card 13 to visual display 14 in the form of image data. Visual display 14 then generates an image (or images) of the sensed data from smart card 13. It will be understood that sensor structure 15 can include optical sensors, capable of sensing optically stored information, magnetic sensors, capable of sensing magnetically stored information, and/or electronic sensors, capable of sensing electronically stored information, in addition to or instead of physically engaging electrical contacts. In addition, the CPU in electronics 16 is programmed to interface with communications transceiver 17 and provide for transmissions to and from smart card device 10, thus sensor structure 15 is constructed to communicate information to smart card 13 from the CPU, as well as communicating information from smart card 13 to the CPU.

During operation of smart card device 10, more specifically the conducting of transactions with a host database, smart card device 10 uses cryptological calculations, making data transmissions secure. To commence operation of smart card device 10 the user enters security information, such as a PIN code, which could be input as a series of unique numbers or letters in visual display 14 using controls 19, or as a biometric identifier, such as a finger print or retinal scan. The display element 14 (previously described) when fabricated as a high resolution touch sensitive panel, is capable of not only displaying data but also acting as the biometric input device for more secure applications. When utilizing device 10 in a financial setting, the smart card CPU processes the security information and using communications transceiver 17, transmits a transaction packet, dependent upon user input, to a host financial database. The transaction packet once received by the host database is verified and processed by the host database, transmitting confirmation back to smart card device 10, which subsequently records the information on smart card 13 and provides a visual image thereof. There is provided as a part of electronics 16 a central processing unit (CPU), such as a portable consumer computer device, which serves as the heart of the system. The transmission of information from smart card device 10 to the host database utilizes wireless technology, more specifically communications transceiver 17, such as a two-way pager device, capable of transmitting and receiving the information utilized during the transaction. There is provided within housing 11 of smart card device 10 a speaker/microphone 18 as part of communications transceiver 17.

It should be understood that use of smart card device 10 as a conventional pager device is anticipated by this disclosure. To this end, controls 19 allow the user to choose the mode of operation of device 10, more specifically choosing between a smart card reader/transmission mode or in a conventional pager mode. Alternatively, smart card device 10 is programmed to permit use as a conventional pager as a default when a smart card, such as smart card 13, is not physically engaged in slot 12.

During operation in a smart card reader/transmission mode, smart card device 10 is capable of conducting transactions allowing for remote transactions, such as the addition of monetary value to value holding smart cards as well as the purchase, thus subsequent debit from a value card, such as for the purchase of catalog sales merchandise. In a typical scenario utilizing smart card device 10 in a commercial purchasing transaction, the user would be able to receive and preview specially formatted graphical advertisements within display 14, such as for a movie theatre. The user would conduct a transaction for the purchase of movie tickets by transferring money from an inserted stored value card. The ticket purchase information would be transmitted form the host database and ultimately stored on the smart card. Once arriving at a movie theatre location, the user would then produce the card holding the purchased ticket information. Thus the combination of communications transceiver 17 to smart card device 10 makes it possible to access a wide variety of interactive graphical consumer data.

Figure 3:
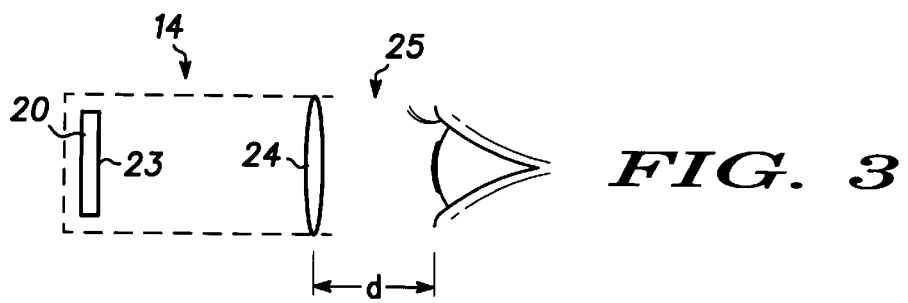
FIG. 3 is a simplified schematic view of a portion of the portable smart card device of FIG. 1.

Referring specifically to FIG. 3, an example of visual display 14 is illustrated in a simplified schematic view. Display 14 includes apparatus 20 for providing an image on a surface 23. An optical system, represented by lens 24, is positioned in spaced relation to surface 23 of apparatus 20 and produces a virtual image viewable by an eye spaced from an aperture 25 defined by lens 24.

Figure 4:
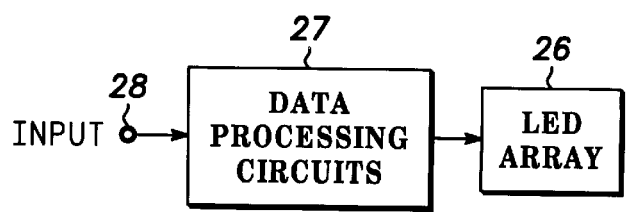
FIG. 4 is a simplified block diagram of a portion of the portable smart card device of FIG. 1.

Apparatus 20 is illustrated in more detail in FIG. 4 and includes, for example, semiconductor electronics such as a light emitting device (LED) array 26 driven by data processing circuits 27. Data processing circuits 27 include, for example, logic and switching circuit arrays for controlling each LED in LED array 26. Data processing circuits 27 include, in addition to or instead of the logic and switching arrays, a microprocessor or similar circuitry for processing input signals of software instructions to produce a desired image on a device such as LED array 26. It will be understood that data processing circuits 27 and LED array 26, while illustrated separately for purposes of this description, could be formed on the same semiconductor chip in some applications.

Figure 5:
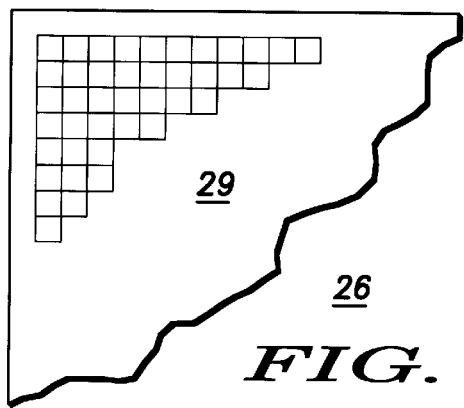
FIG. 5 is a view in top plan of a portion of the apparatus of FIG. 4.

In this specific embodiment LED array 26 includes light emitting diodes which are utilized because of the extremely small size that can be achieved and because of the simplicity of construction and operation. It will of course be understood that other image generating devices may be utilized, including but not limited to lasers (such as vertical cavity surface emitting lasers), liquid crystal devices, organic light emitting diodes, etc. Referring specifically to FIG. 5, a plan view of LED array 26 is illustrated in which the LEDs are formed in a regular pattern of rows and columns on a single substrate 29, which in this embodiment is a semiconductor chip. Portions of substrate 29 are broken away to simplify the drawing but it should be understood that many of the other circuits, and especially drivers, could be included on the same substrate. By addressing specific LEDs by row and column in a well known manner, the specific LEDs are energized to produce an image or images. Digital or analog data is received at input terminal 28 and converted by data processing circuits 27 into signals capable of energizing selected LEDs to generate the predetermined image.

It will be understood by those skilled in the art that LED array 26 and substrate 29 are greatly enlarged in the figures.

The actual size of substrate 29 is on the order of a few milli-meters along each side, with the light emitting area or array being generally in the range of 2 to 50 milli-meters and preferably 5 to 10 milli-meters, with each LED being less than 20 microns on each side and preferably on the order of as little as one micron on a side. It should be understood that the actual light emitting device array is much smaller, because bonding pads, etc. add several milli-meters of area on each side. Generally, the larger size substrates or chips simply mean that more light emitting devices are used in the array to provide more definition, color, etc. As the semiconductor technology reduces the size of the chip, greater magnification and smaller lens systems are required. Reducing the size of the lenses while increasing the magnification results in greatly limiting the field of view, substantially reducing eye relief and reducing the working distance 'd' of the lens system.

The lens system, represented schematically by lens 24, is mounted in spaced relation from surface 23 of apparatus 20 so as to receive the image from surface 23, magnify it a predetermined amount and create the aperture within which the virtual image is viewed. In the present embodiment, lens 24 magnifies the image fifteen times (15×) so that the image from LED array 26 is magnified fifteen times its original angular size. Generally, a magnification of at least ten is required to magnify the image sufficiently to be perceived by a human eye. It will of course be understood that the lens system may be adjustable for focus and additional magnification, if desired, or may be fixed in housing 11 for simplicity.

Figure 6:
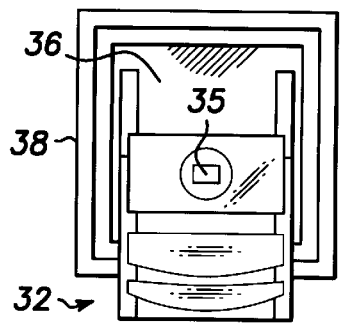
FIGS. 6, 7 and 8 are top front and side views of a portion of the portable smart card device of FIG. 1.
Figure 8:
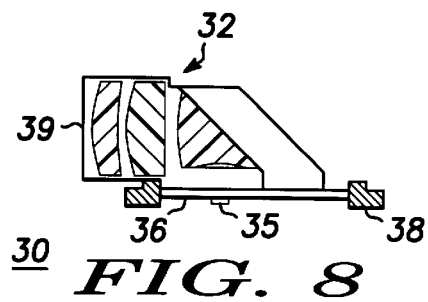
Figure 7:
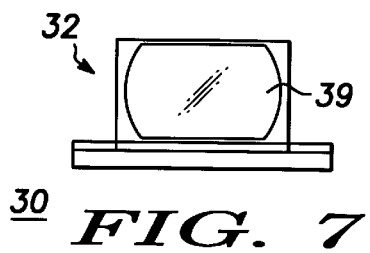

FIGS. 6, 7 and 8 illustrate a top plan view, front view, and side elevation, respectively, of a miniature virtual image display 30 which, in a preferred embodiment, is used as visual display 14 in smart card device 10. Miniature virtual image display 30 incorporates a single fold optical magnifier 32. FIGS. 6, 7 and 8 illustrate miniature virtual image display 30 approximately the actual size to provide some indication as to the extent of the reduction in size achieved by the apparatus. Display 30 includes image generating apparatus 35 with an array of light emitting devices, such as organic or inorganic light emitting diodes, field emission devices, vertical cavity surface emitting lasers, liquid crystal devices, etc. In this specific embodiment, image generating apparatus 35 includes an array of light emitting devices, more specifically an array containing 240 columns and 144 rows of light emitting devices. Each light emitting device is fabricated approximately 20 microns on a side with a center-to-center spacing between adjacent devices of no more than 20 microns. Each light emitting device is turned ON with approximately 1.8 volts and utilizes approximately 50 µA of current when it is turned ON. Apparatus 35 produces a luminance less than approximately 15 fL. Apparatus 35 is mounted on the under-surface of a glass substrate 36 and a driver board 38 is bump-bonded to substrate 36. Additional information on driver boards and bonding of substrates to the driver boards is disclosed in U.S. Pat. No. 5,432,358, entitled "INTEGRATED ELECTRO-OPTICAL PACKAGE", issued Jul. 11, 1995 and assigned to the same assignee, which information is included herein by reference.

Single fold optical magnifier 32 is also mounted on substrate 36 and includes a plurality of optical elements defining a light path from apparatus 35 to a viewing aperture 39, best seen in FIG. 7. The plurality of optical elements are constructed to angularly magnify images, generated by apparatus 35, at a light inlet of a first optical element by greater than ten. Because of the length of the optical path and the size of apparatus 35 (the image source), the horizontal field of view of the optics ranges from approximately 11 degrees at a magnification of 10× to 22 degrees at a magnification of 20×, with the present embodiment having a horizontal field of view of approximately 16 degrees and a magnification of 15×.

Figure 9:
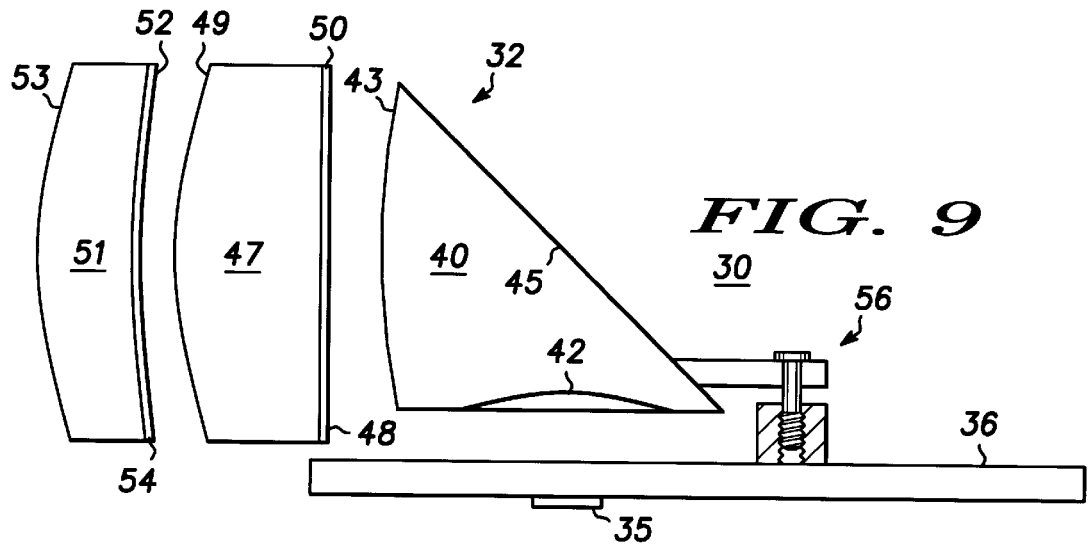
FIG. 9 is an enlarged side view of the apparatus of FIG. 6.

Referring specifically to FIG. 9, a 4× magnified view in side elevation of portions of display 30 of FIG. 6 is illustrated for clarity. From this view it can be seen that the plurality of optical elements includes a first optical element 40 having a field flattening light inlet 42, a spheric surface serving as a light outlet 43 and directed at an angle to field flattening light inlet 42 and a reflecting surface 45 optically positioned between field flattening light inlet 42 and light outlet 43 so as to direct light from field flattening light inlet 42 to light outlet 43. In this specific embodiment, element 40 is formed as a prism and is molded from an optical quality plastic. Generally, it is understood that optical quality plastic is material having a high index of refraction, between approximately 1.5 and 1.6. Reflecting surface 45 may be a separate silvered mirror that is simply molded into first optical element 40, or reflecting surface 45 can be silvered after formation of first optical element 40, or reflecting surface 45 can be uncoated and used in a total internal reflection mode.

In this embodiment, field flattening light inlet 42 takes the form of an aspheric field flattening concave surface molded directly into first optical element 40 and formed as an integral part thereof. It will be understood, however, that field flattening light inlet 42 could be formed as a separate lens and subsequently positioned in optical alignment with the lower surface of first optical element 40. Separate components of course result in additional components and assembly steps which can increase the cost and size of the final structure.

Reflecting surface 45 is disposed, with respect to field flattening light inlet 42 and light outlet 43, to fold or bend light passing through first optical element 40 at an angle between approximately 80° to 100°. More specifically, in the embodiment illustrated, light is reflected at an angle of approximately 95°. It has been found, for example, that an angle of 95° avoids vignetting on the lower part of the image at the outlet of single fold optical magnifier 32.

A significant part of the design of miniature virtual image display 30 is the use of a solid, single fold prism with a convex outlet face to enable increased angular magnification (reduced effective focal length) in the same volume of space compared to the use of a simple turning mirror in the air.

The plurality of optical elements further includes an optical lens 47 having a light inlet 48, positioned adjacent light outlet 43 of first optical element 40, and a light outlet 49. In the specific embodiment illustrated, optical lens 47 is a biaspheric optical lens having an aspheric surface defining light inlet 48 and an aspheric surface defining light outlet 49. Optical lens 47 is fixedly mounted relative to first optical element 40 by any convenient means including an outer housing (illustrated schematically in FIGS. 6–8), a mounting frame, or any other convenient structure. The aspheric surfaces, including light outlet 49 and light inlet 48 of optical lens 47 and light outlet 43 and field flattening light inlet 42 of first optical element 40 are designed to reduce and/or eliminate any aberration in wavefront as it passes from field flattening light inlet 42 to light outlet 49 of optical lens 47.

The plurality of optical elements, including first optical element 40 and optical lens 47, define a light path from field flattening light inlet 42 of first optical element 40 to light outlet 49 of optical lens 47. To fabricate a single fold optical magnifier that is useful in smart card devices, the total average optical length of the optical path should be in the range of approximately 15 to 35 millimeters. In this embodiment the optical path from field flattening light inlet 42 to the aspheric surface defining light outlet 49 of optical lens 47 is approximately 20 millimeters.

Also, the plurality of optical elements, including first optical element 40 and optical lens 47, are constructed to include at least one diffractive optical element positioned in the light path so as to provide additional, primarily chromatic (in this embodiment), aberration correction. In the embodiment illustrated, a diffractive optical element 50 is incorporated into the aspheric surface defining light inlet 48 of optical lens 47. It will of course be understood that diffractive optical elements can, instead of, or in addition to diffractive optical element 50, can be included in any other surface of the plurality of elements in miniature virtual image display 30. If a diffractive optical element is included in a surface that is substantially normal to the light path, as opposed to those in which the light strikes the surface at an angle, the diffractive optical element is somewhat easier to construct because of rotational symmetry, whereas surfaces on which light strikes at an angle have nonrotational symmetry. Because the aspheric surfaces and diffractive optical element 50 make optical lens 47 relatively complex, it has been found that fabrication of optical lens 47 is best done by injection molding.

While first optical element 40 and optical lens 47 can be constructed to form a complete magnifier, in this specific embodiment, a low power optical lens 51 is included as an example of possible extensions of the magnifier. Low power optical lens 51 includes a spheric surface which defines a light input 52 and a spheric surface which defines a light output 53. A diffractive optical element 54 is formed in the inlet surface of low power optical lens 51 to provide additional aberration correction. Low power optical lens 51 is mounted adjacent optical lens 47 and forms an outlet optical element that defines an aperture through which the angularly magnified image can be viewed. The addition of low power optical lens 51 may add somewhat to the size and complexity of miniature virtual image display 30, but provides some angular magnification and aberration correction that reduces the complexity of the various other elements, which can in many applications reduce the overall cost of display 30. Because of its low power, low power optical lens 51 may also be used as the package window, or viewing aperture. In applications in which only first optical element 40 and optical lens 47 are utilized, it may be convenient to define the viewing aperture with a glass or plastic window, which may be clear, a light filter, etc.

In many applications it may be desirable to include apparatus for focusing the final image. To this end, first optical element 40 (and other elements 47 and 51, if desired) is mounted on substrate 36 by means of a threaded adjustment 56 which can be rotated by a thumb screw, screwdriver, etc., to move the fixed assembly of elements 40, 47 and 51 vertically toward and away from substrate 36 and apparatus 35. Focusing is accomplished by simply changing the distance between field flattening light inlet 42 and the image generated on apparatus 35.

Figure 10:
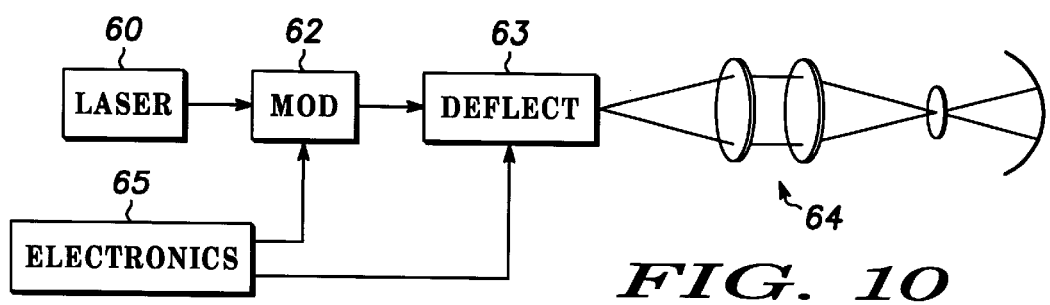
FIG. 10 is a block diagram of another visual display for the portable smart card device of FIG. 1.

FIG. 10 is a block diagram of a direct retinal scan display, which might also be utilized as visual display 14 of FIG. 2. A laser 60, which may be any of the well known lasers including solid state lasers, such as vertical cavity surface emitting lasers, diode lasers, diode-pumped lasers, etc., supplies a coherent light beam to a modulator 62. Modulator 62 impresses video information onto the light beam generally by modulating the intensity of the light beam as, for example, by providing changes in the power level of laser 60. Depending upon the application, the modulation could be as simple as turning laser 60 off and on, which essentially translates into a digital system. Acousto-optic modulators are one of the preferred modulators for most applications, but other techniques, such as electro-optics and mechanical are completely feasible.

The modulated light beam from modulator 62 is directed to a deflection system 63. A lens system 64 is used to focus the light beam from deflection system 63 into an eye. The focal length of lens system 64 is chosen so that the scanning system focal point is within the pupil of the eye and the coherent beam focal point is at the retina of the eye.

Timing and control of modulator 62 and deflection system 63 is provided by electronics 65. Electronics 65 includes a basic oscillator, or timer, which provides the timing signals to cause the sweeping and modulating to occur at the proper times. Also, electronics 65 provides video signals to modulator 62 to modulate the light beam to the correct intensity at the required times. Further, electronics 65 provides horizontal and vertical (orthogonal) deflection signals to cause deflection system 63 to periodically scan the light beam in a raster. Depending upon the application and the desired image resolution, the horizontal deflection frequency may be on the order of 15 to 30 kHz., the vertical deflection is on the order of 60 Hz., and the modulating frequency may be on the order of 12 MHz.

The purpose of deflection system 63 is to scan the modulated light beam on the retina of the eye, or "write" an image on the retina. There are many possible configurations for deflection system 63 and lens system 64, depending upon the application of the display and how it is desired to form the image in the eye. Additional information on this type of display is available in a copending U.S. patent application entitled "DIRECT RETINAL SCAN DISPLAY", Ser. No. 08/292,193, filed Aug. 18, 1994, assigned to the same assignee, which is a file wrapper continuation of U.S. patent application entitled "DIRECT RETINAL SCAN DISPLAY", Ser. No. 07/857,193, filed Mar. 24, 1992. While the direct retinal scan display does not technically generate a virtual image, the direct retinal scan display is included in the definition of a virtual display apparatus for purposes of this disclosure because of the similarity thereto.

Figure 11:
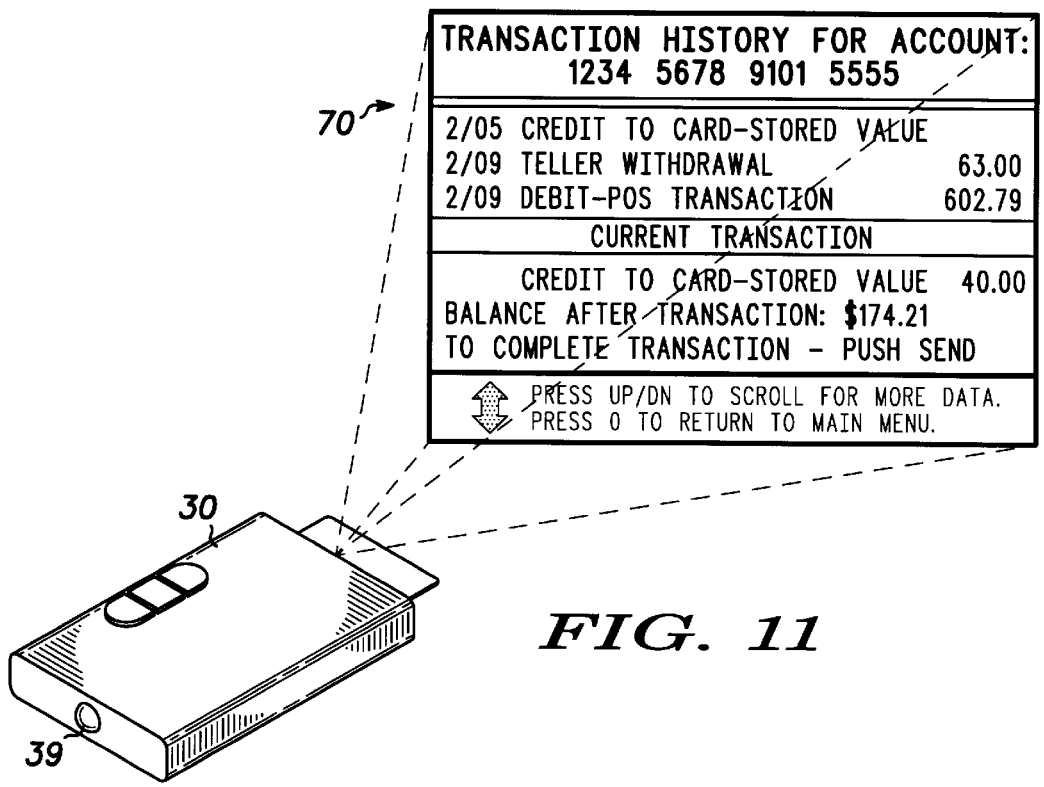
FIG. 11 is an isometric illustrating the operation of the portable smart card device of FIG. 1.

Referring to FIG. 11, a perspective view of smart card device 10 is illustrated with miniature virtual image display 30 mounted therein so that only viewing aperture 39 is visible. It is anticipated by this disclosure, that dependent upon the use requirements of device 10, there may be included within housing 11 a direct view display (not shown) for the viewing of a direct view image, such as in the instance where device 10 is being utilized simply as a conventional paging unit. FIG. 11 further illustrates a typical view 70, or virtual image, of the information stored on smart card 13, as well as transaction information, as seen by an operator looking into viewing aperture 39 of smart card device 10, which view 70 (virtual image) appears to be behind smart card device 10. View 70 could appear to be as large as an 8.5 by 11 sheet of paper or larger and could include, for example, a complete financial statement of previous account activity, or simply informational data regarding the current transaction, etc.

Figure 12:
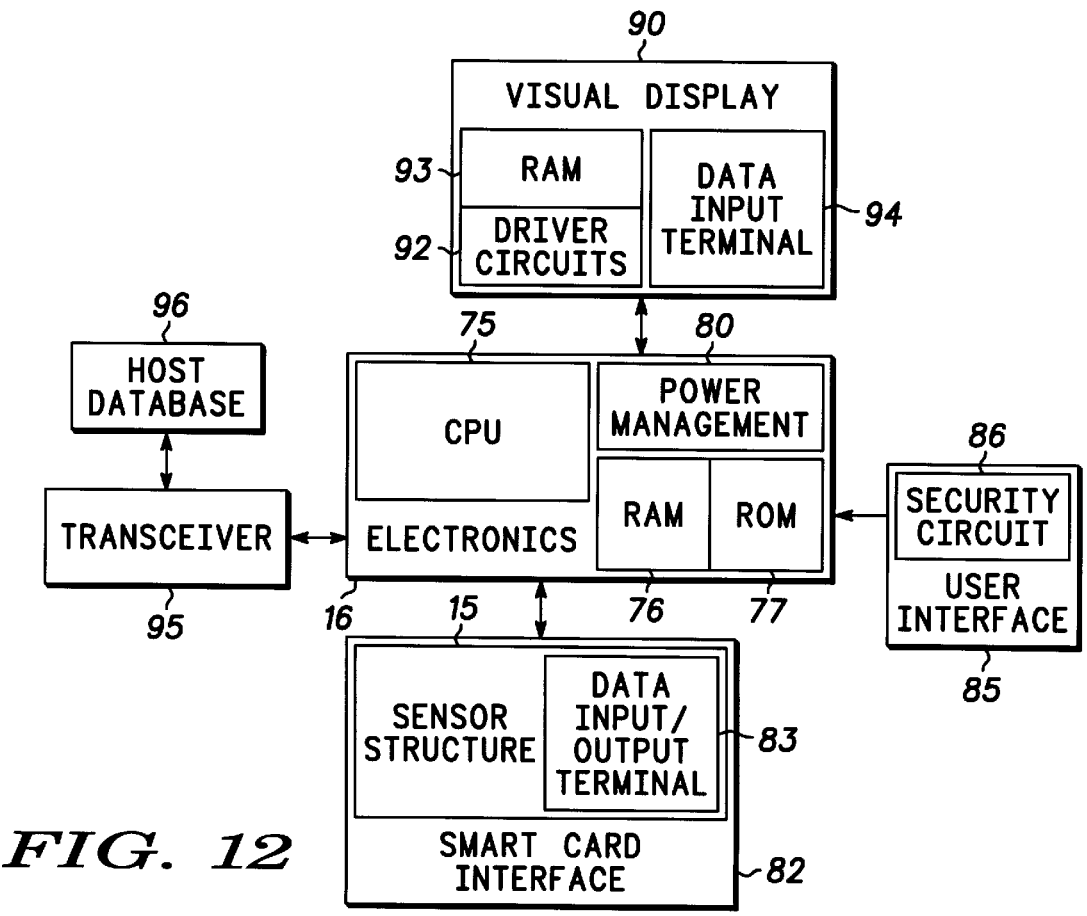
FIG. 12 is a block diagram of the portable smart card device of FIG. 1.

Turning now to FIG. 12, a simplified block diagram of smart card device 10 is illustrated. In this specific embodiment of smart card device 10, a central processor unit (CPU)

75 is illustrated as a part of electronics 16, using a random access memory (RAM) 76 and a read only memory (ROM) 77. In this preferred embodiment an MC68HC05SC21 available commercially from MOTOROLA, INC. is utilized as CPU 75. It will of course be understood that RAM 76 and ROM 77 can be internal to CPU 75 and/or external memories can be provided for additional or specialized features. A power management circuit 80 is provided to accommodate different smart cards with different power and/or different voltage requirements (e.g. voltages in a range of 1 to 12 volts).

A card interface 82 is used to couple the smart card to CPU 75 and, as described previously, may include any or all of electrical contacts for direct physical connection, optical readers, magnetic sensors, electronic sensors (e.g. infrared sensors, RF sensors, etc. for contactless cards). In this embodiment, card interface 82 includes sensor structure 15 (FIG. 2) including data input and output terminals 83.

A user interface 85 is provided to allow the user to communicate with CPU 75 and, ultimately, the smart card. User interface 85 includes various buttons and controls for operating visual display 14 (in this embodiment). Generally, user interface 85 includes at least an OFF/ON control and means, such as a cursor for pull-down menus, advance/reverse images, etc., to control the views being generated by visual display 14. Associated with user interface 85 is a security circuit 86 which generally will allow operation of smart card device 10 only in response to some secret information known only to the smart card owner, e.g. a PIN number, biometric input, some internal circuit that matches an internal circuit of the smart card, etc. as well as the completion of specific transactions in response to verification of security information by the host database. To this end, user interface 85 may include one or more buttons (generally similar to controls 19 of FIG. 1) which must be properly operated by the user to activate smart card device 10.

A visual display 90 includes an array of light emitting devices coupled to driver circuits 92, RAM 93 for storing and/or correctly orienting image data supplied by CPU 75 and data input terminal 94. Generally, visual display 90 can be any of the displays described above and preferably is miniature virtual image display 30 (FIGS. 6–9). As described above, visual display 90 can include an LCD array such as that described in U.S. Pat. No. 5,486,946, entitled "INTEGRATED ELECTRO-OPTIC PACKAGE FOR REFLECTIVE SPATIAL LIGHT MODULATORS", issued Jan. 23, 1996 and assigned to the same assignee. Also, some typical electronics for generating an image on an array of light emitting devices is described in U.S. Pat. No. 5,432,358, entitled "INTEGRATED ELECTRO-OPTICAL PACKAGE", issued Jul. 11, 1995 and assigned to the same assignee. A communications transceiver 95, such as a two-way pager, or the like, including a data input/output terminal 97, communicates with a host database 96 to transact business between smart card device 10 and the host database 96.

Thus, new and improved apparatus for viewing information and conducting specific transactions utilizing a smart card is disclosed. The new and improved apparatus can be standardized to receive virtually any of the multiple types of smart cards and contains safe features to prevent unwarranted viewing of the information. Also, the new and improved apparatus is portable and easy to operate so that each smart card owner can easily carry an apparatus with them, if they desire, or have one at home or the office for instant apprisal of information stored on the smart card as well as the conduction of commercial and/or financial transactions utilizing the smart card.

While we have shown and described specific embodiments of the present invention, further modifications and improvements will occur to those skilled in the art. We desire it to be understood, therefore, that this invention is not limited to the particular forms shown and we intend in the append claims to cover all modifications that do not depart from the spirit and scope of this invention.

What is claimed is:

1. A portable smart card device comprising:
a portable housing including a viewing aperture;
a visual image display mounted in the portable housing and positioned to provide an image for viewing at the viewing aperture, the visual image display including a data input terminal designed to receive image data thereon;
sensor structure mounted in the portable housing and constructed to have a smart card having data stored thereon positioned adjacent thereto in data sensing juxtaposition, the sensor structure including an input terminal and an output terminal for reading and writing data to the smart card;
electronics mounted in the portable housing and connected to the input terminal and the output terminal of the sensor structure for receiving, processing and transmitting data between a host database and the smart card device and further connected to the input terminal of the visual image display for supplying image data thereto in response to the data; and
a transceiver mounted in the portable housing and connected to the electronics for receiving and transmitting data between the electronics of the portable smart card device and the host database.

2. A smart card device as claimed in claim 1 wherein the portable housing is ergonomically designed to be handheld and the sensor structure includes a slot for receiving the smart card therein.

3. A smart card device as claimed in claim 1 wherein the sensor structure includes contacts positioned to electrically engage the smart card.

4. A smart card device as claimed in claim 1 wherein the sensor structure includes a magnetic sensor to sense magnetically stored information on the smart card.

5. A smart card device as claimed in claim 1 wherein the sensor structure includes an optical sensor to sense optically stored information on the smart card.

6. A smart card device as claimed in claim 1 wherein the visual image display is a virtual image display.

7. A smart card device as claimed in claim 6 wherein virtual image display includes a two dimensional array of light emitting devices connected to provide a complete image, the two dimensional array being coupled to the data input terminal of the virtual image display for receiving the image data and generating the image in response thereto.

8. A smart card device as claimed in claim 7 wherein the two dimensional array of light emitting devices includes a two dimensional array of light emitting diodes.

9. A smart card device as claimed in claim 8 wherein the two dimensional array of light emitting devices includes a two dimensional array of organic light emitting diodes.

10. A smart card device as claimed in claim 7 wherein the two dimensional array of light emitting devices includes a two dimensional array of liquid crystal devices.

11. A smart card device as claimed in claim 1 wherein the electronics includes a central processing unit (CPU) and a random access memory (RAM).

12. A smart card device as claimed in claim 1 wherein the transceiver is a two-way pager.

13. A smart card device comprising:

a portable housing including a viewing aperture;

a virtual image display mounted in the portable housing and positioned to provide an image for viewing at the viewing aperture, the virtual image display including a data input terminal designed to receive image data thereon, the virtual image display further including a two dimensional array of light emitting devices connected to provide a complete image, the two dimensional array being coupled to the data input terminal of the virtual image display for receiving the image data and generating the image in response thereto;

sensor structure mounted in the portable housing and constructed to have a smart card having data stored thereon positioned adjacent thereto in data sensing juxtaposition, the sensor structure including an input terminal for receiving transmitted data thereon and an output terminal having sensed data thereon;

a communications transceiver mounted in the portable housing and including an input terminal for receiving data from the sensor structure and an output terminal having data transmitted from a host database thereon; and electronics mounted in the portable housing and connected to the input terminal of the sensor structure for receiving the transmitted data from the host database and the output terminal of the sensor structure for receiving the sensed data from the smart card and further connected to the input terminal of the virtual image display for supplying image data thereto.

14. A smart card device as claimed in claim 13 wherein the two dimensional array of light emitting devices includes a two dimensional array of light emitting diodes.

15. A smart card device as claimed in claim 14 wherein the two dimensional array of light emitting devices includes a two dimensional array of organic light emitting diodes.

16. A smart card device as claimed in claim 13 wherein the two dimensional array of light emitting devices includes a two dimensional array of liquid crystal devices.

17. A smart card device as claimed in claim 13 wherein the electronics includes a central processing unit (CPU) and a random access memory (RAM).

18. A smart card device as claimed in claim 13 wherein the communications transceiver is a two-way pager.

19. A smart card device as claimed in claim 18 wherein the communications transceiver includes a speaker/microphone and is operational in conjunction with the smart card device and as a separate pager device.

20. A smart card device comprising:

a portable housing including a viewing aperture;

a virtual image display mounted in the portable housing and positioned to provide an image for viewing at the viewing aperture, the virtual image display including a data input terminal designed to receive image data thereon, the virtual image display further including a plurality of optical elements having a light inlet and a light outlet directed at an angle to the light inlet, with a reflecting surface optically positioned between the light inlet and the light outlet so as to direct light from the light inlet to the light outlet, the plurality of optical elements include at least one aspheric surface for aberration correction, the plurality of optical elements defining a light path from the light inlet to the light outlet with a total average optical length in a range of approximately 20 to 35 millimeters, and at least one diffractive optical element positioned in the light path so as to provide further aberration correction, and the plurality of optical elements being constructed to angularly magnify an image source at the light inlet of a first optical element by greater than ten;

sensor structure mounted in the portable housing and constructed to have a smart card having data stored thereon positioned adjacent thereto in data sensing juxtaposition, the sensor structure including an output terminal having sensed data thereon and an input terminal having transmitted data thereon;

electronics mounted in the portable housing and connected to the input terminal and output terminal of the sensor structure for receiving, processing and transmitting data between a host database and the smart card and further connected to the input terminal of the virtual image display for-supplying image data thereto; and a pager mounted in the portable housing and connected to the electronics for receiving and transmitting data between the electronics of the smart card device and the host database.

21. A smart card device as claimed in claim 20 wherein the virtual image display includes a two dimensional array of light emitting devices connected to provide a complete image, the two dimensional array being coupled to the input terminal of the virtual image display for receiving the image data and generating the image in response thereto.

22. A smart card device as claimed in claim 21 wherein the two dimensional array of light emitting devices includes a two dimensional array of light emitting diodes.

23. A smart card device as claimed in claim 22 wherein the two dimensional array of light emitting devices includes a two dimensional array of organic light emitting diodes.

24. A smart card device as claimed in claim 24 wherein the two dimensional array of light emitting devices includes a two dimensional array of liquid crystal devices.

25. A smart card device as claimed in claim 20 wherein the electronics includes a central processing unit (CPU) and a random access memory (RAM).

* * * * *